United States Patent

Day et al.

[11] Patent Number: 6,162,263
[45] Date of Patent: Dec. 19, 2000

[54] METHOD FOR PRODUCING AND SHIPPING METAL CYANIDE SALTS

[75] Inventors: John T. Day, Sandy, Utah; Clayton Odum; Mark Reynolds, both of Winnemucca, Nev.

[73] Assignee: Mining Services International, Sandy, Utah

[21] Appl. No.: 09/128,879

[22] Filed: Aug. 4, 1998

[51] Int. Cl.⁷ .................... C01C 3/10; B65D 81/00
[52] U.S. Cl. .................. 23/302 T; 423/371; 23/293 R; 206/524.5
[58] Field of Search .......... 423/371; 23/302 T, 23/293 R; 206/524.5

[56] References Cited

U.S. PATENT DOCUMENTS

| | | | |
|---|---|---|---|
| 2,742,344 | 4/1956 | Inman et al. | 23/79 |
| 2,944,344 | 7/1960 | Green et al. | 34/17 |
| 2,993,754 | 7/1961 | Jenks et al. | 23/79 |
| 3,615,176 | 10/1971 | Jenks et al. | 23/84 |
| 3,619,132 | 11/1971 | Mann et al. | 23/79 |
| 4,083,935 | 4/1978 | Makar | 423/379 |
| 4,847,062 | 7/1989 | Rogers et al. | 423/379 |
| 4,902,301 | 2/1990 | Rogers et al. | 23/302 T |
| 5,383,940 | 1/1995 | Bober et al. | 23/313 FB |
| 5,674,617 | 10/1997 | Riemenschneider et al. | 428/402 |

OTHER PUBLICATIONS

"Cyanides, Organic Synthesis Electroplating Mining—NaCN, KCN," Degussa AG, pp. 1–45.

"Sodium Cyanide—Properties, Uses, Storage and Handling," E.I du Pont de Nemours & Co. (Inc.), pp. 1–20 (Jul. 1985).

*Primary Examiner*—Gary P. Straub
*Attorney, Agent, or Firm*—Madson & Metcalf

[57] ABSTRACT

Metal cyanide suitable for shipment is prepared by introducing an aqueous metal cyanide feed stream to a crystallizer to form a slurry of metal cyanide crystals in their mother liquor. The crystallization step occurs at a temperature between 30° C. and 70° C., and preferably between 50° C. to about 60° C. The metal cyanide crystals are separated from their mother liquor to form a wet cake product containing from about 75 to 98 wt. % anhydrous metal cyanide crystals, from about 4 to 24 wt. % water, and from about 1 to 5 wt. % of metal hydroxide. The wet cake product is placed into a shipping container for shipment to a desired location. A metal cyanide solution is prepared by dissolving the wet cake product.

26 Claims, 1 Drawing Sheet

METHOD FOR PRODUCING AND SHIPPING METAL CYANIDE SALTS

FIELD OF THE INVENTION

The present invention relates to an improved and more economical method for the production and delivery of metal cyanide salts.

BACKGROUND

Contacting hydrogen cyanide with a liquid hydroxide solution produces a cyanide solution according to the following chemical reactions:

$$MOH + HCN \rightleftarrows MCN + H_2O \qquad (1)$$

Where M is a metal cation, such as an alkali metal. In most commercial applications, M is sodium.

Sodium cyanide is commercially available in two forms: a 30 wt. % aqueous solution and 95 to 99 wt. % solid briquettes and granules. The predominant use for sodium cyanide is as a reagent in the isolation of precious minerals, particularly gold. Minor quantities are used in electroplating and in chemical synthesis.

There are two general types of sodium cyanide producers: those that manufacture solid sodium cyanide and market the product in a wide geographical area, including exports, and those that produce sodium cyanide solution and market the product locally, usually within a radius of about 250 miles of its production point. Because of solubility limitations, stable sodium cyanide solutions are limited to concentrations around 30% by weight. Since the mining industry uses sodium cyanide solution in its operations, this product form is usually preferred.

The hydrogen cyanide which is used to produce cyanide salts is produced from several processes. The most common process involves the reaction of natural gas with ammonia, in the presence of oxygen or air, over precious metal catalysts. This reaction is known as the Andrussow process. The products of this reaction are a diluted stream of hydrogen cyanide, water, hydrogen, carbon dioxide, carbon monoxide, as well as the excess quantities of ammonia and methane, along with nitrogen which came with the air source. Other minor contaminants may include other nitrites formed in the reaction. In most processes, this gas stream is purified by isolating the hydrogen cyanide to a purity of at least 99.5%.

A second reaction involving natural gas and ammonia was developed by Degussa and is known as the BMA process. The natural gas and ammonia are reacted over a precious metal catalyst, but in the absence of oxygen. The products of this reaction are similar to those of the Andrussow process, except that there is no water, carbon dioxide or carbon monoxide. The hydrogen cyanide is normally purified as anhydrous hydrogen cyanide through distillation before it is reacted to form other cyanide derivatives or metal cyanides.

In a third process, hydrogen cyanide can be prepared as a bi- or co-product from the production of acrylonitrile in which propylene and ammonia are reacted in the presence of air to yield acrylonitrile. Approximately one pound of hydrogen cyanide is produced for every 10 or 11 pounds of acrylonitrile produced. It is isolated as 99.5% anhydrous hydrogen cyanide before being reacted with caustic or other materials.

In the world today, DuPont produces approximately 25% of all sodium cyanide manufactured. Degussa produces about 20%, and ICI produces about 15%. DuPont uses the Andrussow process and isolates the hydrogen cyanide before manufacture of sodium cyanide. DuPont also produces some sodium cyanide from the co-product hydrogen cyanide production from acrylonitrile. Degussa uses the BMA process and isolates/purifies the hydrogen cyanide before manufacture of sodium cyanide. ICI uses the Andrussow process and isolates/purifies the hydrogen cyanide stream before manufacturing sodium cyanide.

Besides using pure hydrogen cyanide, most producers also use high purity sodium hydroxide. The purity of these raw materials has been found to be necessary to obtain metal cyanide salt having a desirable crystal size and crystal habit.

The aqueous metal cyanide solution is typically concentrated at higher temperature and under reduced pressure by evaporation of water, as disclosed in U.S. Pat. No. 3,619,132. Metal cyanide salt precipitates as a fine-crystalline paste, which is separated, dried, and further processed to obtain the final commercial forms: powder, granules, or briquettes. The drying and product handling equipment must include expensive filters, scrubbers, seals, and other equipment to contain any cyanide dust, which is extremely toxic. These cyanide treatment costs for water and air represent a substantial capital expense.

Producing metal cyanide salt granules and briquettes through compacting requires a specific moisture content and composition. For example, solid sodium cyanide is easily compactable with a water content between 0.2 and 1% by weight. If the moisture content is too low, the compacted product disintegrates. If the moisture content is too great, the compactor becomes clogged. In practice, it is difficult to obtain the required moisture content due to impurities in the raw materials and water. In addition, other common impurities, such as sodium formate, sodium chloride, sodium hydroxide, iron and other impurities can impede formation of large crystals and negatively affect compacted product formation.

Dry alkali cyanide is shipped to consumers in specially designed containers which exclude exposure to atmospheric air. Anhydrous sodium cyanide is hygroscopic, and it can absorb substantial quantities of water causing serious shipping and storage problems due to caking.

Many consumers of alkali cyanide dissolve the dry product in water. To avoid hydrolysis and the evolution of harmful hydrogen cyanide vapors according to reaction (1) above, a metal hydroxide salt, such as sodium or potassium hydroxide, is added to the dilution water.

Another potentially dangerous problem when handling dry alkali cyanide is dust formation. Because of the extreme toxicity of metal cyanide salts, appropriate containment of metal cyanide dust is necessary, adding to the ultimate cost of manufacturing and using dry metal cyanide salts.

One method of overcoming the disadvantages of drying cyanide salts to produce powder, granules or briquettes is to not crystallize, separate, and dry the cyanide salt, but to simply transport the metal cyanide as a concentrated solution, typically from about 30 wt. % to 40 wt. % solution. This method avoids the expense of crystallizing and drying. It also lessens the consumers' expense of forming a usable metal cyanide solution at a manufacturing or mining site. However, the transportation expenses are significantly higher because about 70% of the product shipped is water.

Other attempts have been made to overcome the disadvantages of drying alkali cyanide. U.S. Pat. No. 4,902,301 describes a process for preparing and delivering of solutions of sodium cyanide purposefully engineered to congeal in the dihydrate state of the product. The dihydrate product is prepared by evaporatively cooling a sodium cyanide slurry at a concentration greater than 58 wt. %, and preferably from 60 to 65 wt. %.

According to U.S. Pat. No. 4,902,301, the sodium cyanide slurry contains 26 percent solid crystals, but may contain up to 40 percent solid crystals. The solid crystals are not separated from their mother liquor. Instead, the entire slurry is quickly solidified to minimize settling or separation of the solid sodium cyanide crystals. The final product contains approximately 65 to 80 wt. % dihydrate and about 15 to 30 wt. % anhydrous sodium cyanide crystals. The cost of shipping remains high because of the large quantity of water (35 wt. % to 40 wt. %) remaining in the final product.

There is, therefore, a need in the art for an improved method for producing and shipping metal cyanide salts which does not require expensive drying equipment, filters, seals and other devices needed to handle metal cyanide dust.

It would also be an advancement in the art to provide a method for producing and shipping metal cyanide salts which avoids the expense and problems associated with drying, but which enables very high concentrations of metal cyanide to be shipped, thereby reducing transportation costs.

It would be a further advancement in the art to provide a method for producing and shipping metal cyanide salts which can be used with impure raw materials and process streams.

Such methods for producing and shipping metal cyanide salts are disclosed and claimed herein.

SUMMARY OF THE INVENTION

The present invention is directed to methods for producing and shipping metal cyanide salts. Metal cyanide salt suitable for shipment is prepared by introducing an aqueous metal cyanide feed stream to a crystallizer to form a slurry of metal cyanide crystals in their mother liquor. The crystallization step occurs at a temperature between 30° C. and 70° C., and preferably between 50° C. to about 60° C. The feed stream can contain impurities which would be unacceptable in conventional alkali cyanide processes due to alteration of the alkali cyanide crystal size and habit. However, the resulting crystal size and habit are not important according to the present invention.

The metal cyanide crystals are separated from their mother liquor in a solid/liquid separator, such as a mechanical filter, centrifuge, or settling tank separator. The solid cyanide crystals form a wet cake product containing from about 75 to 98 wt. %, more preferably from 85 to 95 wt. % anhydrous metal cyanide crystals, from about 4 to 24 wt. % water, and from about 1 to 5 wt. % of metal hydroxide or other impurities. The wet cake product is placed into a shipping container for shipment to a desired location. An aqueous cyanide solution to be used by the consumer can be prepared by dissolving the wet cake product within the container in a manner similar to current in-situ dissolution of alkali cyanide briquettes. Alternatively, the wet cake product can be transferred to another vessel for dissolution into the aqueous cyanide solution.

The present invention represents a substantial improvement over conventional alkali cyanide processes because the wet cake produced from the solid/liquid separator is not further dried or briquetted, thereby reducing the capital and operating costs of the process. Because the material contains surface moisture, it is resistant to dusting during handling.

The present invention is a further advancement in the art because metal cyanide salt, suitable for use in mining applications, can be produced by reacting an impure hydrogen cyanide stream with lower grade caustic, such as diaphragm grade or lime-soda processed caustic. Of course, higher grade caustic, such as membrane grade caustic, can be used in the present invention, but the use of higher grade feedstock materials may not be economically justified.

DESCRIPTION OF THE INVENTION

Figure 1:
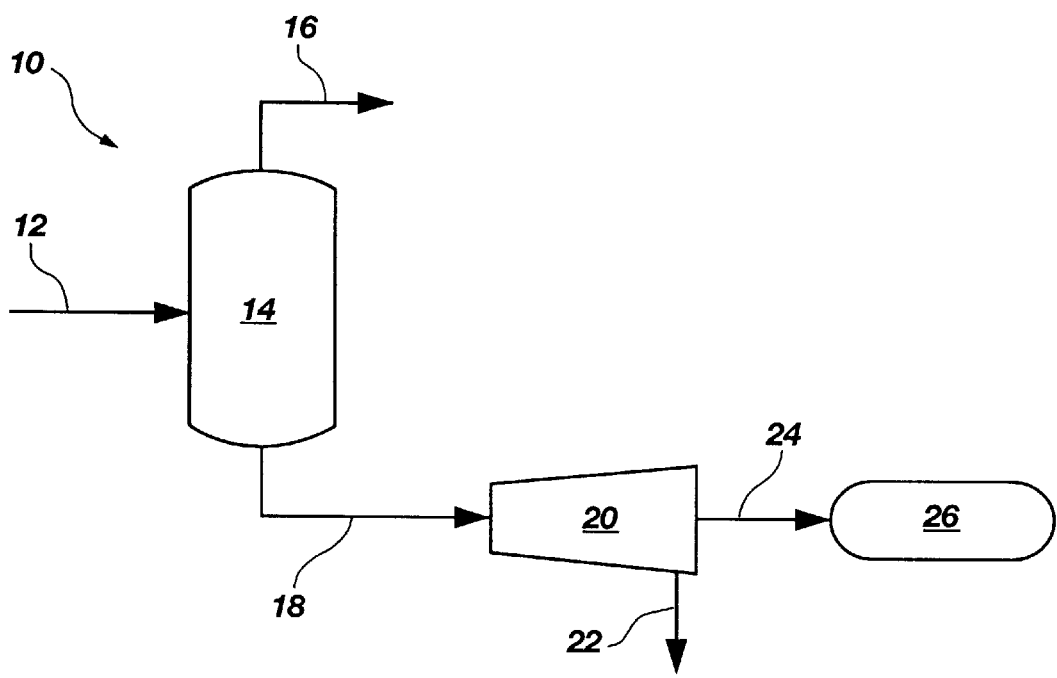
FIG. 1 is a schematic drawing of a process for preparing metal cyanide salt for shipment within the scope of the present invention.

The present invention will now be described with reference to the figures. FIG. 1 shows a schematic flow diagram of a process for preparing metal cyanide salt for shipment within the scope of the present invention. In the process, generally designated 10, an aqueous metal cyanide feed stream 12 is fed to a crystallizer 14. The feed stream 12 typically has an cyanide salt concentration in the range from about 15 to about 45 wt. %, and more preferably in the range from about 25 to about 35 wt. %, and most preferably about 30 wt. %. The metal cyanides prepared according to the present invention preferably include sodium cyanide, potassium cyanide, and calcium cyanide. These metal cyanides currently can be prepared more economically than other metal cyanides. It will be appreciated that other metal cyanides can be used within the scope of the present, including copper cyanide and zinc cyanide.

The aqueous metal cyanide feed stream 12 contains metal salt impurities that act as crystal growth modifiers in the crystallization process. When the metal cyanide manufacturing process utilizes impure raw materials and process streams, sodium carbonate is a common impurity which can cause scaling in process equipment. On occasion, soluble antiscalant polymers are added to the liquid sodium cyanide process stream. These polymers do not adversely affect the wet-cake product and may act as crystal-modifiers to aid in the flow and handling characteristics of the wet cake product.

One advantage of the process within the scope of the present invention is that the aqueous metal cyanide feed stream can include a measurable impurity or mixture of impurities. Typical impurities include chloride, chlorate, hydroxide, carbonate, and formate salts, impurities found in diaphragm-grade or lime-soda processed caustic, such as iron, magnesium, and trace metals, antiscalant compounds, and mixtures thereof. The impurity or mixture of impurities can be present in the aqueous metal cyanide feed stream at a concentration up to 6 wt. % and typically between about 1 to 5 wt. %. The ability to use impure feed stock and still produce a suitable final product greatly improves the process economics.

In operation, the crystallizer 14 will concentrate the metal cyanide through removal of water by evaporation. Water is removed from the crystallizer via water vapor stream 16. Vapor stream 16 can be further processed to condense water vapor according to conventional procedures known in the art.

The crystallizer 14 causes metal cyanide crystals to form in their mother liquor. The metal cyanide crystals in their mother liquor constitute a slurry which exits the crystallizer 14 via slurry stream 18. The metal cyanide crystals are preferably formed at a temperature above about 30° C. and below about 70° C. Liquid metal cyanide decomposes at elevated temperature, above 60° C. More preferably, crystallization occurs at a temperature in the range from about 50° C. to about 60° C. When working with sodium cyanide, it is also desirable to keep the crystallization temperature high so that sodium cyanide dihydrate is not formed.

The metal cyanide crystals are separated from their mother liquor in a separator 20 while still maintaining a temperature between about 30° C. and 70° C. Separator 20 can include conventional solid/liquid separators such as mechanical filters, centrifuge separators, and settling tank separators. The mother liquor is removed via stream 22. The mother liquor stream 22 is preferably recycled in the processes to recover its metal cyanide salt content.

The solid metal cyanide, in the form of a wet cake product, is removed via stream 24. The wet cake product typically contains from about 75 to 98 wt. % anhydrous metal cyanide crystals, from about 4 to 24 wt. % water, and from about 1 to 5 wt. % of metal hydroxide and other impurities. More preferably, the wet cake product contains from 85 to 95 wt. % anhydrous metal cyanide.

The wet cake product is loaded into a storage or shipping container 26 for delivery to a manufacturing or mining facility that uses the metal cyanide. The container 26 is preferably sealed to prevent exposure to atmospheric air and moisture. In one preferred embodiment, the shipping container 26 is configured to facilitate storage and to allow it to be placed on a rolling chassis for delivery to the consumer. After transport to a desired location, the wet cake product is preferably dissolved within the container 26 to form an aqueous metal cyanide solution. Sufficient metal hydroxide is preferably in the wet cake product to prevent hydrolysis of the metal cyanide product as its dissolved.

The shipping container 26 is preferably constructed with hardware to facilitate dissolution within the container. Such hardware includes water connectors for introducing water to dissolve the cyanide product within the container. A complete system (not shown) consists of the container, a tank, pump, and level control used to facilitate the dissolution of the product. The wet cake product, having a high surface area, exhibits a high rate of dissolution. It will be appreciated that the shipping container can also be configured to allow the metal cyanide wet cake to be transferred to a dissolution vessel for dissolution into the aqueous cyanide solution.

The following examples are offered to further illustrate the present invention. These examples are intended to be purely exemplary and should not be viewed as a limitation on any claimed embodiment.

EXAMPLE 1

Preparation of Sodium Cyanide Wet Cake

A bench scale experiment was performed to prepare a wet cake product containing sodium cyanide from an aqueous sodium cyanide solution. In the batch process, a commercially available sodium cyanide feed solution was used. The feed solution was prepared using the Andrussow process with diaphragm grade caustic and HCN which was not isolated. The feed solution, containing approximately 31.3 wt. % sodium cyanide, was placed into a vacuum distillation system. The distillation system included a flask, equipped with a magnetic stirrer and electric mantle to heat the aqueous sodium cyanide solution. Water vapor was removed from the crystallizer and condensed in a condenser. Once sufficient water was evaporated to cause crystallization, crystal growth was allowed to proceed for about one hour. A slurry containing sodium cyanide crystals in their mother liquor was formed. The resulting crystals were separated from their mother liquor by vacuum filtration. A wet cake was produced containing about 83.2 wt. % sodium cyanide.

Additional experiments were performed using a laboratory centrifuge to separate the crystals from their mother liquor. The laboratory centrifuge was more efficient at removing the mother liquor and was able to produce a wet cake of sodium cyanide crystals containing over 90 wt. % sodium cyanide.

EXAMPLE 2

Affect of Impurities in Sodium Cyanide Feed Stream

In this example, a wet cake product containing sodium cyanide was prepared from an aqueous sodium cyanide solution according to the procedure of Example 1, except that the aqueous sodium cyanide solution was intentionally doped with impurities. In one batch, 2 wt. % sodium chloride was added to the sodium cyanide solution; in another batch, 2 wt. % sodium carbonate was added; and in a third batch, 5 wt. % sodium hydroxide was added. The wet cake product was obtained from each batch. In all cases, the appearance of the wet cake product remained unchanged from the wet cake product produced in accordance with Example 1. The color remained white, indicating relative purity of the sodium cyanide product. These results suggest that substantially pure sodium cyanide wet cake product can be obtained from an impure sodium cyanide feed stream.

EXAMPLE 3

Dissolution of Sodium Cyanide Wet Cake

The dissolution of sodium cyanide wet cake was evaluated in this example. About 95 grams of wet cake product was placed in the bottom of an Erlenmeyer flask. A long-stemmed funnel was also placed in the flask with the funnel end extending to the bottom of the flask. About 223 grams of water was poured into the flask, filling from the bottom. After 30 minutes, all but about 10% of the wet cake product had dissolved, without agitation of any kind. A gentle swirl dissolved the remaining product. The results show that the wet cake product will rehydrate with relative ease.

EXAMPLE 4

Dissolution of Sodium Cyanide Wet Cake

The dissolution of sodium cyanide wet cake was evaluated in this example. A dissolution vessel was prepared by welding a bottom onto a three-inch diameter stainless steel pipe. A ¼-inch steel tube was inserted near the bottom of the pipe, terminating in the middle of the pipe. About 103 grams of sodium cyanide wet cake, containing approximately 90 wt. % sodium cyanide was placed into the dissolution vessel. A piston was inserted within the pipe which compressed the wet cake. The pressure was estimated to be equivalent to a static wet cake pressure of 30 feet. The vessel was insulated and placed on a hot plate generating a temperature of about 50° C. The vessel containing the wet cake was heated overnight under compression. The heat was removed. About 205 grams of water were introduced into the bottom of the vessel through the steel tube, which flooded the wet cake. The wet cake dissolved rapidly, except for the top surface of the wet cake which remained solid, similar to the outer crust of a briquette. The compressed outer crust was an artifact introduced as a condition of the experiment and not a property of the sodium cyanide wet cake under normal conditions. The bulk material which had been subject to 30 feet of compression dissolved readily. The results show that the wet cake product under normal conditions will rehydrate with relative ease.

EXAMPLE 5

Preparation of Sodium Cyanide Wet Cake With Recycling Mother Liquor

In this example, wet cake product containing sodium cyanide was prepared substantially in accordance with the procedure of Example 1, except that the separated mother liquor was recycled. 175 ml (206.8 grams) of feed material, containing about 30 wt. % NaCN, was used initially. The wet cake was separated from the mother liquor by vacuum filtration. The wet cake was further dewatered in a centrifuge. The mother liquor obtained in the centrifuge was added back to the mother liquor that was separated at the vacuum filter. The final wet cake product was weighed and analyzed, yielding 10.5 grams of wet cake, containing 91.71 wt. % NaCN. The mother liquor was also weighed and returned to the flask. Fresh feed was added to the flask to keep the starting volume constant at 175 ml.

After each cycle, the composition of the wet cake was analyzed to determine if a system purge was needed to remove impurities within the feed streams. After seventeen cycles, it was found that the concentration of wet cake product remained fairly constant, as did the yield. The average crystal wet cake yield was about 12 grams (standard deviation 1.6), and the average wet cake NaCN concentration was about 93 wt. % (standard deviation 1.6). The results suggest that impurities are carried away from the system in the small amount of mother liquor present on the wet cake product.

It will be appreciated that the present invention includes improvements in the crystallization process of metal cyanide salts. Current technology requires the crystal product to be of certain size and habit. These issues are not important according to the present invention because the wet cake product can be loaded directly into the shipping container without further drying or processing, such as granulation or pressing. Therefore, the capital and operating costs are reduced.

From the foregoing, the present invention eliminates all of the water possible with mechanical separation. This method thereby improves flowability, long-term handling and dissolution of the cyanide product. Less heat is required during the dissolution process of wet-cake as compared with a dihydrate product. No in-container evaporation or cooling mechanism are required according to the present invention as compared to the process of U.S. Pat. No. 4,902,301.

The present invention provides the following improvements over current processes for producing and transporting alkali cyanide:

1. Because the material contains surface moisture, it is resistant to dusting during handling and transport.
2. Producing a wet cake product reduces overall capital and operating costs compared to the conventional industry drying and briquetting processes.
3. The shipping container, containing from 75 to 98 wt. % solid product, is shipped to the consumer's site where the material can be dissolved and placed in the consumer's tank as a nominal 30 wt. % liquid. Shipping costs of the wet cake, per weight of product, are comparable to that of completely dried material.
4. The aqueous cyanide-containing feedstock can include impurities which improve the economics of the process.
5. Consumer required criteria for crystal size or habit are avoided.
6. Because the wet cake product is substantially dry, it is immobile. If there is accidental rupture of a shipping or storage vessel, then the environmental and safety risks of metal cyanide being released are low.
7. When pure materials are used in the process of the present invention impurities in the system are lowered permitting better crystal growth and improving overall system performace.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

What is claimed is:

1. A process for preparing metal cyanide salt for shipment comprising:
   (a) introducing an aqueous metal cyanide feed stream to a crystallizer;
   (b) forming a slurry of anhydrous metal cyanide crystals in their mother liquor;
   (c) separating the metal cyanide crystals from their mother liquor such that the separated metal cyanide crystals form a wet cake product comprising from about 75 to 95 wt. % anhydrous metal cyanide crystals, from about 4 to 24 wt. % mother liquor, and from about 1 to 5 wt. % of metal hydroxide; and
   (d) placing the wet cake product into a shipping container.

2. A process for preparing metal cyanide for shipment as defined in claim 1, wherein the aqueous metal cyanide feed stream has a metal cyanide concentration in the range from about 15 to about 45 wt. %.

3. A process for preparing metal cyanide for shipment as defined in claim 1, wherein the aqueous metal cyanide feed stream has a metal cyanide concentration in the range from about 25 to about 35 wt. %.

4. A process for preparing metal cyanide for shipment as defined in claim 1, wherein the wet cake comprises from about 85 to 95 wt. % anhydrous metal cyanide crystals.

5. A process for preparing metal cyanide for shipment as defined in claim 1, wherein the aqueous metal cyanide feed stream includes from 1 to 5 wt. % impurity or mixture of impurities.

6. A process for preparing metal cyanide for shipment as defined in claim 5, wherein the impurity or mixture of impurities includes a metal chloride, chlorate, carbonate, and formate salt, or an antiscalant compound.

7. A process for preparing metal cyanide for shipment as defined in claim 1, wherein the impurity or mixture of impurities includes an impurity found in diaphragm-grade or lime-soda processed caustic.

8. A process for preparing metal cyanide for shipment as defined in claim 1, wherein the metal cyanide is selected from sodium cyanide, potassium cyanide, and calcium cyanide.

9. A process for preparing metal cyanide for shipment as defined in claim 1, wherein the metal cyanide crystals are separated from their mother liquor using a mechanical filter.

10. A process for preparing metal cyanide for shipment as defined in claim 1, wherein the metal cyanide crystals are separated from their mother liquor using a centrifuge separator.

11. A process for preparing metal cyanide for shipment as defined in claim 1, wherein the metal cyanide crystals are separated from their mother liquor using a settling tank separator.

12. A process for preparing metal cyanide for shipment as defined in claim 1, wherein the anhydrous metal cyanide crystals are formed in their mother liquor at a temperature from about 30° C. to about 70° C.

13. A process for preparing metal cyanide for shipment as defined in claim 1, wherein the anhydrous metal cyanide crystals are formed in their mother liquor at a temperature from about 50° C. to about 60° C.

14. A process for delivering metal cyanide comprising:
   (a) forming a slurry of anhydrous metal cyanide crystals in their mother liquor at a temperature from about 30° C. to about 70° C.;
   (b) separating the anhydrous metal cyanide crystals from their mother liquor to form a wet cake product containing the separated anhydrous metal cyanide crystals;
   (c) placing the wet cake product into a shipping container;
   (d) transporting the shipping container to a desired location; and
   (e) dissolving the wet cake product within the shipping container to form a metal cyanide solution.

15. A process for delivering metal cyanide as defined in claim 14, further comprising the step of sealing the shipping container prior to transporting the container.

16. A process for delivering metal cyanide as defined in claim 14, wherein the wet cake comprises from about 75 to 98 wt. % anhydrous metal cyanide crystals.

17. A process for delivering metal cyanide as defined in claim 14, wherein the wet cake comprises from about 85 to 95 wt. % anhydrous metal cyanide crystals.

18. A process for delivering metal cyanide as defined in claim 14, wherein the metal cyanide salt is selected from sodium cyanide, potassium cyanide, and calcium cyanide.

19. A process for delivering metal cyanide as defined in claim 14, wherein the metal cyanide crystals are separated from their mother liquor using a mechanical filter.

20. A process for delivering metal cyanide as defined in claim 14, wherein the metal cyanide crystals are separated from their mother liquor using a centrifuge separator.

21. A process for delivering metal cyanide as defined in claim 14, wherein the metal cyanide crystals are separated from their mother liquor using a settling tank separator.

22. A process for delivering metal cyanide as defined in claim 14, wherein the anhydrous metal cyanide crystals are formed in their mother liquor at a temperature from about 50° C. to about 60° C.

23. A process for delivering metal cyanide as defined in claim 14, wherein the wet cake product comprises from about 75 to 95 wt. % anhydrous metal cyanide crystals, from about 4 to 24 wt. % mother liquor and from about 1 to 5 wt. % of metal hydroxide and impurities.

24. A process for preparing metal cyanide for shipment comprising:
   (a) forming a slurry of anhydrous metal cyanide crystals in their mother liquor at a temperature from about 30° C. to about 70° C.;
   (b) separating the anhydrous metal cyanide crystals from their mother liquor to form a wet cake product containing the separated anhydrous metal cyanide crystals; and
   (c) placing the wet cake product into a shipping container without further drying of the wet cake product.

25. A process for preparing metal cyanide for shipment as defined in claim 24, wherein the slurry of anhydrous metal cyanide crystals in their mother liquor is obtained by introducing an aqueous metal cyanide feed stream to a crystallizer.

26. A process for preparing metal cyanide for shipment as defined in claim 24, wherein the wet cake product comprises from about 75 to 95 wt. % anhydrous metal cyanide crystals, from about 4 to 24 wt. % mother liquor and from about 1 to 5 wt. % of metal hydroxide and impurities.

* * * * *